United States Patent
Policello et al.

(10) Patent No.: US 6,221,922 B1
(45) Date of Patent: Apr. 24, 2001

(54) FOAM CONTROL AGENTS FOR SILICONE SURFACTANTS

(75) Inventors: George A. Policello, Ossining; Sue L. Yang, Thornwood, both of NY (US)

(73) Assignee: Crompton Corporation, Greenwich, CT (US)

( * ) Notice: Subject to any disclaimer, the term of this patent is extended or adjusted under 35 U.S.C. 154(b) by 0 days.

(21) Appl. No.: 09/274,746

(22) Filed: Mar. 23, 1999

(51) Int. Cl.$^7$ ...................................................... B01D 19/04
(52) U.S. Cl. ........................... 516/118; 516/124; 516/204; 504/363; 424/405
(58) Field of Search ................................ 516/117, 118, 516/124, 204; 504/362, 363; 424/405

(56) References Cited

U.S. PATENT DOCUMENTS

| | | | |
|---|---|---|---|
| 4,400,288 | * 8/1983 | Dhanani et al. | 510/347 |
| 4,514,319 | 4/1985 | Kulkarni et al. | 516/117 |
| 5,045,225 | * 9/1991 | Aronson et al. | 516/123 |
| 5,145,879 | 9/1992 | Budnik et al. | 521/112 |
| 5,504,054 | * 4/1996 | Murphy | 504/116 |
| 5,558,806 | * 9/1996 | Policello et al. | 516/204 |
| 5,968,872 | * 10/1999 | Policello et al. | 516/124 |

FOREIGN PATENT DOCUMENTS

| | | |
|---|---|---|
| 0046342 | 2/1985 | (EP) . |
| 0791384 | 8/1997 | (EP) . |

OTHER PUBLICATIONS

G. Koerner, "Introductory Remarks on the Peculiarities of Silicone Chemistry", *Silicones: Chemistry and Technology*, (CRC Press, Boca Raton, FL, copyright 1991, month unavailable) pp. 1–6.

* cited by examiner

Primary Examiner—Richard D. Lovering
Assistant Examiner—Daniel S. Metzmaier
(74) Attorney, Agent, or Firm—Shirley S. Ma

(57) ABSTRACT

The present invention teaches that low foaming, superspreading compositions may be made the combination of three components (a) a tri or tetra-siloxane alkoxylate; (b) a siloxane polyether copolymer; and (c) a silicone foam control agent which is a tri or tetra siloxane propoxylate.

16 Claims, 1 Drawing Sheet

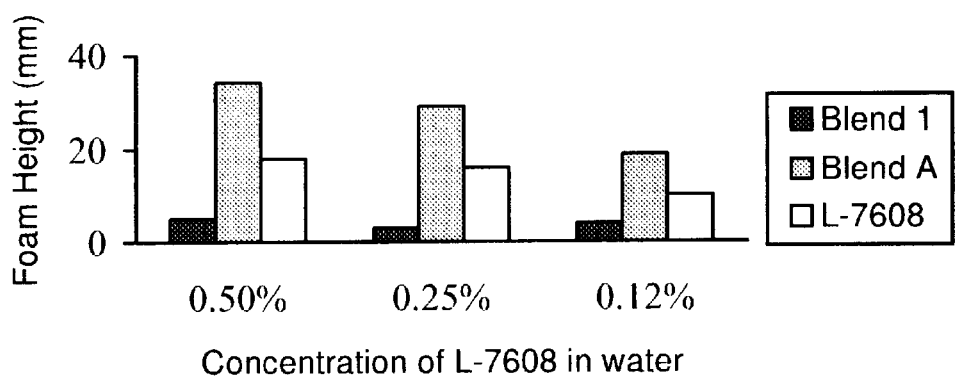
Fig. 1: Foaming Property
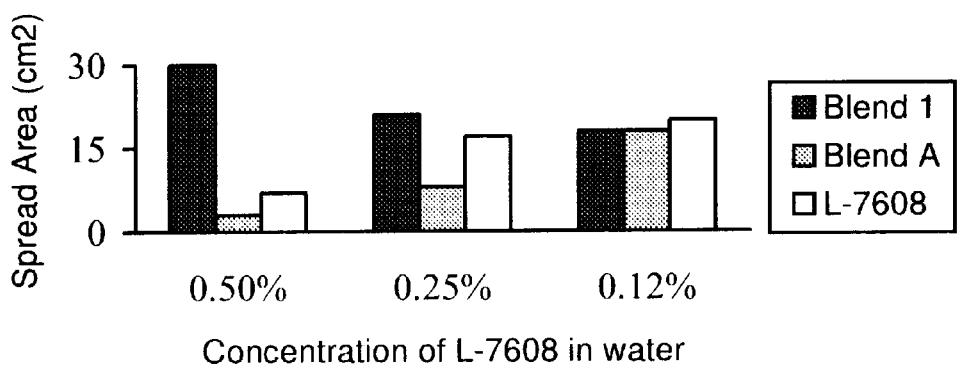
Fig. 2: Spreading Property

FOAM CONTROL AGENTS FOR SILICONE SURFACTANTS

BACKGROUND OF THE INVENTION

One of the most common deficiencies with high performance wetting agents comprised of alkoxylated organosilicone surfactants is that foam generated from these products is difficult to control. Organosilicone surfactants, especially trisiloxane alkoxylates (TSA), are able to reduce the aqueous surface tension of spray solutions to values below 21 mN/m. At these low values it is difficult for conventional foam control agents, such as, polydimethylsiloxanes (PDMS), to spread at the liquid/air interface, because the bulk surface tension of these foam control agents is similar to the aqueous surface tension of these organosilicone surfactants.

In a related publication, EP 0046342 discloses the use of an antifoam in a detergent composition containing a PDMS, and a silicone-polyoxyalkylene copolymer ("Copolymer"). The Copolymer therein is a spreading agent for the defoamer composition, not a defoamer. U.S. Pat. No. 4,514,319 to Kulkarni et al. also describes the use of a Copolymer as a component in an antifoam composition as a spreading agent and an emulsifier, but not as a foam control agent ("FCA").

EP 0 791 384 to Policello discloses adding a second silicone to the TSA to lower the foaming of the TSA, however such combinations do not provide optimal foam control and maintain superspreading.

BRIEF DESCRIPTION OF THE DRAWINGS

FIGS. 1 and 2 show the spreading and foaming properties of compositions of the present invention as compared to the prior art.

SUMMARY OF THE INVENTION

The present invention teaches that low foaming, superspreading compositions may be made the combination of three components (a) a tri or tetra-siloxane alkoxylate (TSA); (b) a Copolymer; and (c) a silicone foam control agent (FCA). The FCA is of the formula $R^2(CH_3)_2SiO[SiO(CH_3)_2]_X[SiOCH_3R^1]_YSi(CH_3)_2R^2$ wherein X+Y =1 to 2, Y=1 to 2, X=0 to 1, $R^1$ is an alkyleneoxide group of the formula $-C_aH_{2a}O(C_3H_6O)_zR^3$ wherein a=2 to 4, z is 1 to 15, and $R^2$ is methyl or $R^1$ and $R^3$ is hydrogen, a hydrocarbon radical of 1 to 4 carbons or acetyl. The Copolymer is of the formula $R^4(CH_3)_2SiO[SiO(CH_3)_2]_f[SiOCH_3R^5]_gSi(CH_3)_2R^4$ wherein f+g=3 to 100, $R^5$ is $-C_aH_{2a}O(C_aH_{2a}O)_jR^3$, each a=2 to 4, j=1 to 60, and $R^4$ is either methyl or $R^5$. The TSA is $(CH_3)_3SiO[SiO(CH_3)_2]_c[SiOCH_3R^6]_dSi(CH_3)_3$ wherein c=0 or 1, d=1 or 2, and $R^6$ is $-C_aH_{2a}O(C_2H_4O)_k(C_3H_6O)_lR^3$ wherein k=1 to 20, and l=0 to 20.

DETAILED DESCRIPTION OF THE INVENTION

It is an object of this invention to provide a siloxane alkoxylate composition that gives improved foam control as well as superspreading properties in aqueous systems. It is another object of this invention to provide a water insoluble FCA that is soluble in a surfactant matrix comprised of two silicone copolymers or in mixtures with non-silicon surfactants. FCA's which are insoluble in the surfactant matrix cause the mixture to phase separate in a short period of time, requiring the applicator to remix the components prior to use to ensure full efficacy and are undesirable. A further object of this invention is to provide a clear, homogeneous, low foaming formulation having a water insoluble FCA, a water soluble or dispersible TSA and a Copolymer when said formulation is used in an aqueous mixture.

The compositions of the present invention are comprised of a TSA, a Copolymer and, a FCA, and optional ingredients which are to be placed in water. Novel low foam wetting agent compositions comprise a compatible mixture of about 0.1% to about 50% by weight of a FCA, and from about 99.9% to 50% by weight of the TSA and the Copolymer. The TSA to Copolymer weight ratio should be in the range of 100:1 and 1:4, inclusive, preferably 9:1 to 1:1. The specific range depends on the surfactant structure.

SURFACTANT MATRIX

The surfactant matrix is made up of, at least, the TSA and the Copolymer. The TSA and the Copolymer are dispersible or soluble in water, e.g., 0.025 to 1% by weight solubility in water at room temperature.

In the TSA, preferably k+l is about two to twenty and more preferably six to twelve. k is preferably 2 to 10. l is most preferably 0 to 10. Preferably, c=0 and d=1. In $R^6$, $R^3$ is preferably hydrogen. "a" is preferably 3.

In the Copolymer, preferably each a=2 to 3, preferably j=3 to 60, and more preferably 5 to 40. Preferably $R^4$ is methyl. In $R^5$, $R^3$ is preferably hydrogen. a is preferably 3 for the bridge to the polyether, but the ratio of ethylene oxide (a=2), propylene oxide (a=3) and butylene oxide (a=4) units in the polyether will depend on the system of use and the optimum ratio among these may be determined by one of skill in the art. Preferably there are no butylene oxide units.

Examples of the TSA are SILWET L-77®, SILWET® L-7608 and SILWET® L-7280® TSAs commercially available from Witco Corp. Examples of the Copolymer are SILWET® L-7220, SILWET® L-7500 and SILWET® L-7600.

The preferred weight ratio of TSA to Copolymer is about 9:1 to 1:1.

FOAM CONTROL AGENT

The structure of the FCA is set forth above. The FCA must be insoluble in water at concentrations $\geq 0.1$ wt % and must be soluble or form a stable dispersion (i.e., does not readily phase separate) in the surfactant matrix at greater than 50 wt % at ambient conditions. In the formula above Y is preferably 1, X is preferably 0, a is preferably 3, z is preferably 1 to 5, and $R^3$ is preferably hydrogen.

OPTIONAL INGREDIENTS

The surfactant matrix also may incorporate organic based cosurfactants that have an average of less than or equal to ten carbons in the main chain (not including branching from the main chain) of the hydrophobic group. Examples of these short chain surfactants are trimethylnonanol ethoxylates (e.g., TERGITOL® TMN-6, Union Carbide Corp.), isodecyl alcohol ethoxylates (e.g., RHODASURF® DA-630, Rhodia); alkyl polyglucosides (e.g., AGRIMUL® 2067, Henkel Corp.), acetylenic diol ethoxylates (e.g., SURFYNOL® 440, Air Products). In addition, the surfactant matrix may include polyalkyleneoxide copolymer surfactants, such as copolymers of polyoxyethylene and polyoxypropylene (e.g., PLURONIC® surfactants, BASF Corp.). The cosurfactant may be additional allyl started polyether which is used to manufacture any of the siloxane copolymers which is left over from the reaction. If the cosurfactant is used, the proportion of the organosilicone surfactant to the organic cosurfactant contained in the surfactant matrix is in the ratio of 1 to 99% by weight of the organosilicone to 99 to 1% of the organic cosurfactant.

Optionally, the composition can include from about 0.1 to 10% by weight of a hydrophobized silica filler, for example, TULLANOX® 500 (Tulco), and AEROSIL® is R-812

(Degussa). While such a foam breaking substance may be added, the present composition may be essentially free of foam control agents other than the FCA. If silica is use, polydimethylsiloxane oil may be used as well.

The composition may also include active ingredients, including, jet dyes and permanent press resins in textile applications, coating resins, acrylates, epoxides, polyurethane or copolymers of the same in waterborne coatings applications, or a pesticide in agriculture applications.

Water may be considered part of the composition. If in concentrate form, water is part of the composition at 1 to 50 wt %. In standard form, water may be present at 0.01 to 10 wt %, preferably 0.01 to 2 wt %.

Solvents such as alcohols, petroleum distillates and cycloalkanes may be used, but are not preferred.

Thickeners, biostats (e.g., Phenonip), UV stabilizers, coalescing agents (e.g., butyl CELLOSOLVE or butyl CARBITOL solvents (Union Carbide Corp.) may also be used in compositions.

MANUFACTURE

The manufacture of the TSA, FCA and the Copolymer, each individually, are known in the art. The organic surfactants, silica and pesticides generally are commercially available and are well known in the art to manufacture.

The composition is prepared by combining the components in a desired ratio, and mixing these ingredients according to conventional methods that will provide a clear to slightly hazy, uniform product. Mixing by mechanical agitator or a mechanical shaker are examples of such methods. When the optional silica is included in the composition it is first added to the FCA component using high shear mixing, such as a Lightnin' mixer.

EXAMPLES

The following examples are presented to further illustrate and explain the present invention and should not be taken as limiting in any regard. Unless otherwise indicated, all parts and percentages are by weight, and are based on the weight at the particular stage of the processing being described.

Description of Test Methods

Spreading Property—The homogeneous composition of the low foaming wetting agents of this invention was mixed with water to a specified concentration. Ten microliter aliquot of the aqueous mixture was withdrawn from the stock using an automatic pipette and discharged onto a polyester sheet (purchased from Paul N. Gardner Co., Form P300-7C) which was conditioned in an enclosed chamber containing the humidity in the 40–60% range. The liquid was allowed to spread for 30 sec. and the edge of the surface covered by the liquid was quickly marked using a marker. The diameter of the surface was measured and the area was calculated and designated as spread area.

Foaming Property—Sixty grams of the aqueous mixture of the low foaming wetting composition of this invention was placed in a glass bottle of 120 gram capacity. The mixture was shaken for 1 min. using a wrist action shaker purchased from Burrel. The foam height was measured after shaking.

Example 1

The preparation of the components of this present invention are described in this example. The SiH intermediates were prepared by acid equilibration as outlined in *Silicones, Chemtistry and Technology* (CRC Press, 1991, pages 1 to 6, and U.S. Pat. No. 5,145,879 to Budnik, et. al.). The intermediates were used to prepare a number of alkyleneoxide modified silicones. A reaction vessel containing 529.3 g (2.379 moles) of an SiH intermediate ($Me_3SiO[MeSi(H)O]_{1.0}SiMe_3$) and 94.1 g (0.578 moles) allyl alcohol propoxylate (AAP) (Lyondell Chemical Company) was heated to 90° C. while under a nitrogen blanket. The reaction was catalyzed with 1.5 mL of chloroplatinic acid solution (1.0 wt % in ethanol), based on the total charge. The reaction mixture exotherm was maintained between 90 and 110° C. while the remaining 376.6 g (2.310 moles) of AAP was added dropwise. The reaction mixture to was allowed to stir at 100° C. for 20 minutes after the addition of the AAP was complete. The product showed no residual SiH when introduced to a fermentation tube containing KOH/water/ethanol solution. The product was cooled to 70° C. and neutralized with 70 g $NaHCO_3$, and stirred for an additional hour. The product was filtered, and stripped on a Rotovap at 70° C./≦5 mm Hg for 2 hours. The resulting product was a clear pale amber liquid, with a Brookfield viscosity of 10 cps at 25° C., using spindle LV 2 at 60 rpm. This material is designated as FCA and has the following structure: $(CH_3)_3SiO[SiOCH_3R]Si(CH_3)_3$, wherein R is $C_3H_6O(C_3H_6O)_{1.6}H$.

Blend 1 is a homogeneous mixture prepared by mixing 20 parts of FCA, 20 parts of SILWET® L-7220 Copolymer and 55 parts of SILWET® L-7608 TSA (both from Witco Corp.). SILWET® L-7220 Copolymer is a copolymer having 17,000 molecular weight and contains a polyether with 20% ethylene oxide (EO) and 80% propylene oxide (PO). SILWET® L-7608 TSA is a trisiloxane surfactant containing only ethylene oxide (EO).

Aqueous mixtures containing 0.86%, 0.43% and 0.215% of Blend 1 were prepared. The mixtures therefore contain 0.5%, 0.25% and 0.125% SILWET® L-7608 TSA respectively. These mixture are white dispersions. The foaming and spreading properties of these mixtures are shown in Table 1 & 2. Also included in Table 1 are aqueous mixtures containing 0.5%, 0.25% and 0.125% SILWET® L-7608 TSA as controls to demonstrate the benefits of this invention.

TABLE 1

Foaming Property - Foam Height (mm) after shake test

| Concentration of SILWET ® L-7608 ® | Blend 1 | SILWET ® L-7608 |
|---|---|---|
| 0.5% | 5 | 18 |
| 0.25% | 3 | 16 |
| 0.125% | 4 | 10 |

TABLE 2

Spreading Property - Spreading Area ($cm^2$)

| Concentration of SILWET ® L-7608 ® | Blend 1 | SILWET ® L-7608 |
|---|---|---|
| 0.5% | 30 | 7 |
| 0.25% | 21 | 17 |
| 0.125% | 18 | 20 |

The spread areas of Blend 1 at 0.25% and 0.125% SILWET® L-7608 TSA concentrations are comparable to those of SILWET® L-7608 TSA by itself. However, at 0.5% SILWET® L-7608 TSA concentration, the spread area of Blend 1 is much larger than that of SILWET® L-7608 TSA.

Comparative Example A

Blend A was prepared by mixing 20 parts of SILWET® L-7220 and 55 parts of SILWET® L-7608 TSAs (Witco Corp.). Aqueous mixtures containing 0.5%, 0.25% and 0.125% SILWET® L-7608 TSA were prepared and their foaming and spreading properties were measured. The data are shown in Table 3 & 4.

TABLE 3

Foaming Property - Foam Height (mm)

| Concentration of SILWET ® L-7608 | Blend A | SILWET ® L-7608 |
|---|---|---|
| 0.5% | 34 | 18 |
| 0.25% | 29 | 16 |
| 0.125% | 19 | 10 |

TABLE 4

Spreading Property - Spreading Area (cm$^2$)

| Concentration of SILWET L-7608 ® | Blend A | SILWET ® L-7608 |
|---|---|---|
| 0.5% | 3 | 7 |
| 0.25% | 8 | 17 |
| 0.125% | 18 | 20 |

The results show very poor foaming and spreading properties without FCA.

Example 2

Blend 2 is a homogeneous mixture prepared by mixing 20 parts of FCA, 20 parts of SILWET® L-7220 Copolymer and 55 parts of SILWET® L-7280 TSA. SILWET® L-7280 is a trisiloxane containing ethylene oxide (EO) and propylene oxide (PO) (Witco Corp.). Aqueous white dispersion mixtures of Blend 2 containing 0.5%, 0.25% and 0.125% SILWET® L-7280 TSA were prepared. The foaming and spreading properties of these mixtures are shown in Table 5 & 6. Also included in Table 1 are aqueous mixtures containing 0.5%, 0.25% and 0.125% SILWET® L-7280 TSA as controls to demonstrate the benefits of this invention.

TABLE 5

Foaming Property - Foam Height (mm) after shake test

| Concentration of SILWET ® L-7280 | Blend 2 | SILWET ® L-7280 |
|---|---|---|
| 0.5% | 5 | 9 |
| 0.25% | 3 | 12 |
| 0.125% | 4 | 16 |

TABLE 6

Spreading Property - Spreading Area (cm$^2$)

| Concentration of SILWET ® L-7280 | Blend 2 | SILWET ® L-7280 |
|---|---|---|
| 0.5% | 30 | 9 |
| 0.25% | 23 | 14 |
| 0.125% | 10 | 15 |

The spread areas of Blend 2 at 0.125% SILWET® L-7280 TSA concentrations is slightly worse than SILWET® L-7280 TSA by itself. However, at 0.25% and 0.5% SILWET® L-7280 TSA concentration, the spread area of Blend 2 is much larger than that of SILWET® L-7280 TSA.

Comparative Example B

Blend B was prepared by mixing 20 parts of FCA and 55 parts of SILWET® L-7608. Aqueous mixtures containing 0.5%, 0.25% and 0.125% SILWET® L-7608 were prepared and their foaming and spreading properties were measured. The data are shown in Table 7 & 8.

TABLE 7

Foaming Property - Foam Height (mm)

| Concentration of SILWET ® L-7608 | Blend B | Blend 2 |
|---|---|---|
| 0.5% | 3 | 5 |
| 0.25% | 3 | 3 |
| 0.125% | 7 | 4 |

TABLE 8

Spreading Property - Spreading Area (cm$^2$)

| Concentration of SILWET ® L-7608 | Blend B: | Blend 2 |
|---|---|---|
| 0.5% | 24 | 30 |
| 0.25% | 12 | 23 |
| 0.125% | 6 | 10 |

This comparative example shows the good foaming property of Blend B with the absence of a second copolymer. However, the spreading property suffers substantially. Therefore, the second copolymer is critical for optimal performance of this invention.

Example 3

Blend 3 to 5 were prepared by blending 30 parts of FCA, 60 parts of SILWET® L-7608, and 10 parts each of the following Copolymers.

Blend 3—SILWET® L-7220 Copolymer (Witco Corp.)

Blend 4—SILWET® L-7500 Copolymer (Witco Corp.)

Blend 5—SILWET® L-7600 Copolymer (Witco Corp.)

SILWET® L-7500 Copolymer is a silicone polyether copolymer having 3,000 molecular weight and contains only propylene oxide (PO). SILWET® L-7600 Copolymer is a silicone polyether copolymer having 4,000 molecular weight and contains only ethylene oxide (EO).

Aqueous dispersion mixtures of Blend 3, 4 and 5 containing 0.5% SILWET® L-7608 TSA were prepared. The foaming and spreading properties of these mixtures are shown in Table 9 & 10. Also included in the tables is SILWET® L-7608 TSA as controls to demonstrate the benefits of this invention.

TABLE 9

Foaming Property - Foam Height after shake test

| Sample | Foam Height (mm) |
|---|---|
| SILWET ® L-7608 | 15 |
| Blend 3 | 5 |
| Blend 4 | 5 |
| Blend 5 | 7 |

TABLE 10

| Spreading Property - Spreading Area | |
|---|---|
| Sample | Spread Area (cm$^2$) |
| SILWET ® L-7608 | 8 |
| Blend 3 | 17 |
| Blend 4 | 33 |
| Blend 5 | 19 |

We claim:

1. A composition comprising:

(a) a tri- or tetra-siloxane alkoxylate of the formula $$(CH_3)_3SiO[SiO(CH_3)_2]_c[SiOCH_3R^6]_dSi(CH_3)_3$$

wherein
c=0 or 1,
d=1 or 2, provided that when d is 2, c is 0, and R$^6$ is $$-C_aH_{2a}O(C_2H_4O)_k(C_3H_6O)_lR^3$$

wherein
k=1 to 20
l=0 to 20
a=2 to 4 and
R$^3$ is hydrogen, a hydrocarbon radical of 1 to 4 carbons or acetyl;

(b) a copolymer of the formula $$R^4(CH_3)_2SiO[SiO(CH_3)_2]_f[SiOCH_3R^5]_gSi(CH_3)_2R^4$$

wherein
f+g=3 to 100,
R$^5$ is $$-C_aH_{2a}O(C_aH_{2a}O)_jR^3,$$

wherein
each a=2 to 4,
j=1 to 60,
R$^4$ is either methyl or R$^5$, and
R$^3$ is hydrogen, a hydrocarbon radical of 1 to 4 carbons or acetyl; and (c) a silicone foam control agent of the formula $$R^2(CH_3)_2SiO[SiO(CH_3)_2]_X[SiOCH_3R^1]_YSi(CH_3)_2R^2$$

wherein
X+Y=1 to 1,
Y=1 to 2,
X=0 to 1,
R$^1$ is an alkyleneoxide group of the formula $$-C_aH_{2a}O(C_3H_6O)_zR^3$$

wherein
a=2 to 4,
z=1 to 15,
R$^2$ is methyl or R$^1$, and
R$^3$ is hydrogen, a hydrocarbon radical of 1 to 4 carbons or acetyl.

2. The composition according to claim 1 wherein Y=1, X=0, R$^3$ is hydrogen and R$^2$ is methyl and z is 1 to 5.

3. The composition according to claim 2 wherein k+l=2 to 20, k=2 to 10, l=0 to 10, c=0, and d =1.

4. The composition according to claim 3 wherein f+g=3 to 80, each a=2 to 3, j=3 to 60, and R$^4$ is methyl.

5. The composition according to claim 4 additionally comprising an organic surfactant.

6. A composition according to claim 4 additionally comprising water.

7. A composition according to claim 4 additionally comprising silica, but essentially free of any other foam control agent.

8. A composition according to claim 1 wherein the foam control agent is present at about 0.1 to 50% by weight of the composition.

9. A composition according to claim 8 wherein component (a) is present relative to component (b) in a relative weight basis ratio of about 9:1 to 1:1.

10. A composition according to claim 1 additionally comprising a solvent.

11. A method for controlling foam comprising adding to water the following components:

(a) a tri or tetra-siloxane alkoxylate of the formula $$(CH_3)_3SiO[SiO(CH_3)_2]_c[SiOCH_3R^6]_dSi(CH_3)_3$$

wherein
c=0 or 1,
d=1 or 2, provided that when d is 2, c is 0, and R$^6$ is $$-C_aH_{2a}O(C_2H_4O)_k(C_3H_6O)_lR^3$$

wherein
each a=2 to 4
k=1 to 20,
l=0 to 20 and
R$^3$ is hydrogen, a hydrocarbon radical of 1 to 4 carbons or acetyl;

(b) a copolymer of the formula $$R^4(CH_3)_2SiO[SiO(CH_3)_2]_f[SiOCH_3R^5]_gSi(CH_3)_2R^4$$

wherein
f+g=3 to 100,
R$^5$ is $$-C_aH_{2a}O(-C_aH_{2a}O)_jR^3,$$

wherein
each a=2 to 4,
j=1 to 60 and
R$^3$ is hydrogen, a hydrocarbon radical of 1 to 4 carbons or acetyl, and
R$^4$ is either methyl or R$^5$; and (c) a silicone foam control agent of the formula $$R^2(CH_3)_2SiO[SiO(CH_3)_2]_X[SiOCH_3R^1]_YSi(CH_3)_2R^2$$

wherein
X+Y=1 to 2,
Y=1 to 2,
X=0 to 1,
R$^1$ is an alkyleneoxide group of the formula $$-C_aH_{2a}O(-C_3H_6O)_zR^3,$$

wherein
a=2 to 4
z is 1 to 15 and
R$^3$ is hydrogen, a hydrocarbon radical of 1 to 4 carbons or acetyl, and
R$^2$ is methyl or R$^1$.

12. A method according to claim 11 wherein Y=1, X=0, $R^3$ is hydrogen and $R^2$ is methyl and z is 1 to 5, inclusive.

13. A method according to claim 12 wherein k+l=2 to 20, k=2 to 10, l=0 to 10, c=0, and d=1.

14. A method according to claim 13 wherein f+g=3 to 80, each a=2 to 3, j=3 to 60, and $R^4$ is methyl.

15. A method according to claim 14 additionally comprising adding an organic surfactant to the water.

16. A method according to claim 14 additionally comprising adding silica to the water.

* * * * *